(12) United States Patent
Winegarden

(10) Patent No.: US 7,133,499 B2
(45) Date of Patent: Nov. 7, 2006

(54) SYSTEMS AND METHODS FOR PROCESSING EMERGENCY CALLS THROUGH A PUBLIC SWITCHED TELEPHONE NETWORK

(75) Inventor: James F. Winegarden, Maple Grove, MN (US)

(73) Assignee: Qwest Communications International, Inc., Denver, CO (US)

( * ) Notice: Subject to any disclaimer, the term of this patent is extended or adjusted under 35 U.S.C. 154(b) by 213 days.

(21) Appl. No.: 10/833,486

(22) Filed: Apr. 27, 2004

(65) Prior Publication Data

US 2005/0238142 A1 Oct. 27, 2005

(51) Int. Cl.
*H04M 11/00* (2006.01)

(52) U.S. Cl. ...................................... 379/45

(58) Field of Classification Search .................. 379/45, 379/37, 90.01, 93.14; 370/352
See application file for complete search history.

(56) References Cited

U.S. PATENT DOCUMENTS

| | | | |
|---|---|---|---|
| 5,379,337 A | 1/1995 | Castillo et al. | |
| 6,690,932 B1 | 2/2004 | Barnier et al. | |
| 6,711,247 B1 * | 3/2004 | Needham et al. | 379/45 |
| 6,771,742 B1 * | 8/2004 | McCalmont et al. | 379/45 |
| 2001/0028711 A1 * | 10/2001 | Antonucci et al. | 379/245 |
| 2004/0057425 A1 | 3/2004 | Brouwer et al. | |
| 2005/0213716 A1 * | 9/2005 | Zhu et al. | 379/45 |

* cited by examiner

*Primary Examiner*—Stella Woo
(74) *Attorney, Agent, or Firm*—Townsend and Townsend and Crew LLP

(57) ABSTRACT

A method of making an emergency call that includes dialing a three-digit emergency number on a communication device, translating the three-digit emergency number into an emergency service number at an interface, where the interface uses the emergency service number to initiate the emergency call with a public switched telephone network, and sending the emergency call in the public switched telephone network to an emergency selective router, where the emergency selective router routes the emergency call to a public safety answering point. Also, a system to make an emergency call that includes a communication device having an input to dial a three-digit emergency number, an interface to translate the three-digit emergency number into an emergency service number used to initiate an emergency call with a public switched telephone network, and an emergency selective router that receives the emergency call and routes it to a public safety answering point.

20 Claims, 4 Drawing Sheets

SYSTEMS AND METHODS FOR PROCESSING EMERGENCY CALLS THROUGH A PUBLIC SWITCHED TELEPHONE NETWORK

BACKGROUND OF THE INVENTION

The present invention includes systems and method for making emergency calls. More specifically, the present invention includes routing an emergency call (e.g., an E911 call) through a public switched telephone network without sending the call through a dedicated emergency service (ES) trunk.

In the field of telephony, equipment and services for handling emergency telephone calls in the United States have been associated with the three-digit telephone number (TN) "9-1-1". This system has gained widespread support and acceptance by telephone users over previous systems that normally required knowledge of the seven or ten-digit telephone numbers of public safety access points (PSAPs) (e.g., operators and dispatchers for police departments, fire departments, poison control centers, emergency medical services (EMS), hospitals, hazardous material recovery departments, etc.) that were in closest geographic proximity to the emergency situation. For a detailed legislative and technical history of the 9-1-1 system, please see U.S. Pat. No. 6,690,932, filed Sep. 11, 2000, and titled "System and Method for Providing Language Translation Services in a Telecommunications Network", the entire contents of which are herein incorporated by this reference.

When systems and methods were first developed to handle emergency calls by dialing a three-digit emergency telephone number, network designers were concerned about managing such calls through existing public switch telephone networks (PSTNs). PSTNs at the time frequently experienced the so-called "Mother's Day Effect" when the number of telephone subscribers and users simultaneously using the network (e.g., people calling relatives on Mother's Day) exceeded network capacity and resulted in significant numbers of call failing to get completed.

Network designers and public safety officials agreed that emergency calls should not fail to be completed due to the Mother's Day Effect, and developed an more reliable (though more expensive) network infrastructure for emergency calls. This infrastructure (e.g., the 911 network infrastructure) had emergency calls (e.g., calls initiated by dialing 9-1-1) bypass the PSTN and to be placed directly on dedicated emergency service (ES) trunks that would send the calls to the appropriate emergency service router. The emergency service router would then route the calls to the appropriate PSAP. Typically, government regulations required that two or more redundant ES trunks be dedicated to each emergency service router so emergency calls would be assured of completion in the event of an ES trunk malfunctioning and/or failing. The system put in place did boost ease of use and reliability for completing emergency calls, but at a significant increase in infrastructure costs.

The burden of building and maintaining current 911 network infrastructure is relatively small in concentrated urban areas where costs are spread out over a large number of subscribers (e.g., metropolitan areas having more than 150,000 subscribers). However, in less densely and sparsely populated areas, the burden on individual subscribers to build and maintain this infrastructure is much larger, and often subsidized by state and federal fees on non-resident telephone subscribers. This fee revenue, however, may face significant reduction in light of the increased technological changes and cost competitiveness in the telecommunications industry. Thus, there remains a need to provide reliable emergency call service to all network users and subscribers at reduced costs.

BRIEF SUMMARY OF THE INVENTION

Embodiments of the invention include a method of making an emergency call that includes dialing a three-digit emergency number on a communication device, and translating the three-digit emergency number into an emergency service number at an interface. The interface may use the emergency service number to initiate the emergency call with a public switched telephone network. Another step of the method includes sending the emergency call in the public switched telephone network to an emergency selective router, where the emergency selective router routes the emergency call to a public safety answering point.

Other embodiments of the invention include a system to make an emergency call, where the system includes a communication device that includes an input to dial a three-digit emergency number. The system also includes an interface to translate the three-digit emergency number into an emergency service number, where the interface uses the emergency service number to initiate the emergency call with a public switched telephone network. The system further includes an emergency selective router that receives the emergency call from the public switched telephone network and routes the call to a public safety answering point.

Still other embodiments of the invention include a method of routing an emergency call through a public switched telephone network. The method includes translating, automatically, a three-digit emergency number dialed by an emergency service requestor into an emergency service number. The emergency service number is used to initiate the emergency call with the public switched telephone network. The method also includes sending the emergency call through the public switched telephone network to an emergency selective router, where the emergency selective router routes the call to a public safety answering point, and where the emergency call is not sent through a dedicated emergency service trunk.

Additional features are set forth in part in the description that follows, and in part will become apparent to those skilled in the art upon examination of the following specification or may be learned by the practice of the invention. The features and advantages of the invention may be realized and attained by means of the instrumentalities, combinations, and methods particularly pointed out in the appended claims.

DETAILED DESCRIPTION OF THE INVENTION

Embodiments of systems and methods of the present invention include making an emergency call over a public switch telephone network (PSTN) that does not require the large costs of building and maintaining dedicated emergency service (ES) trunks to connect an emergency service requestor (ESR) to an emergency selective router. Embodiments also include adapting the now widely accepted three-digit emergency number dialing (e.g., "9-1-1" dialing) to PSTNs that currently use seven and/or ten-digit numbers as emergency service numbers (ESNs) to send an emergency call to the emergency selective router. By bypassing or eliminating the ES trunks in the emergency call network infrastructure, significant cost savings can be realized.

Embodiments of the present invention also include using the emergency call network infrastructure with a variety of communication devices, including conventional wireline telephones, wireless telephones (e.g., cellular telephones, satellite telephones, etc.) and telephones interfacing with a computer network (e.g., Voice over Internet Protocol (VoIP) telephones). Issues of emergency service requestor identity and location for communication devices that do not have a fixed geographic location (e.g., wireless telephones, VoIP telephones, etc.) are addressed by embodiments of the invention.

System with Conventional ES Trunk

Figure 1:
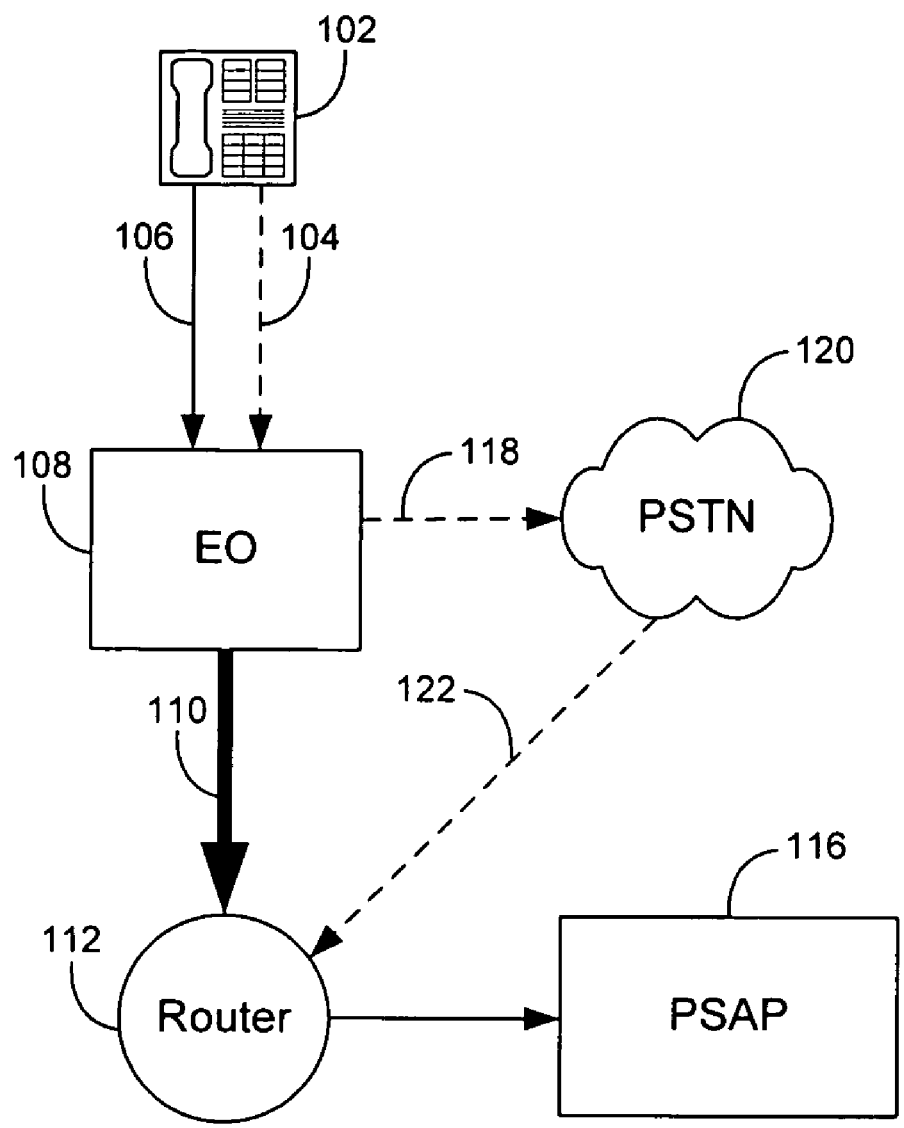
FIG. 1 is a diagram illustrating selected elements of a conventional 9-1-1 emergency telecommunications system.

Referring now to FIG. 1, a system 100 having a conventional dedicated emergency service (ES) trunk 110 is shown. In system 100 a person (not shown) may initiate an emergency call by dialing 9-1-1 on telephone 102. The 9-1-1 call 106 is routed to end office (EO) 108, where the call is recognized as an emergency call that is placed on an ES trunk 110 instead of the public switch telephone network 120. On ES trunk 110, the call is sent directly to the emergency selective router 112, which determines the appropriate public service access point (PSAP) 116 for the call.

If the person knows the emergency service number telephone number (ESN/TN) for the PSAP (normally a seven-digit or ten-digit telephone number) then the person can dial that full number. In some instances, the ESN/TN call 104 is also routed to EO 108, where it may be recognized as an emergency call and placed on ES trunk 110. In other instances, the ESN/TN call may be placed on lines 118 of the PSTN 120, and routed through other lines 122 to the emergency selective router 112, which determines the appropriate PSAP 116 for the call. In still other instances (not shown) the ESN/TN call may be sent directly to PSAP 116 from the PSTN 120 without passing through the emergency selective router 112.

Exemplary Systems for an Emergency Call

Figure 2:
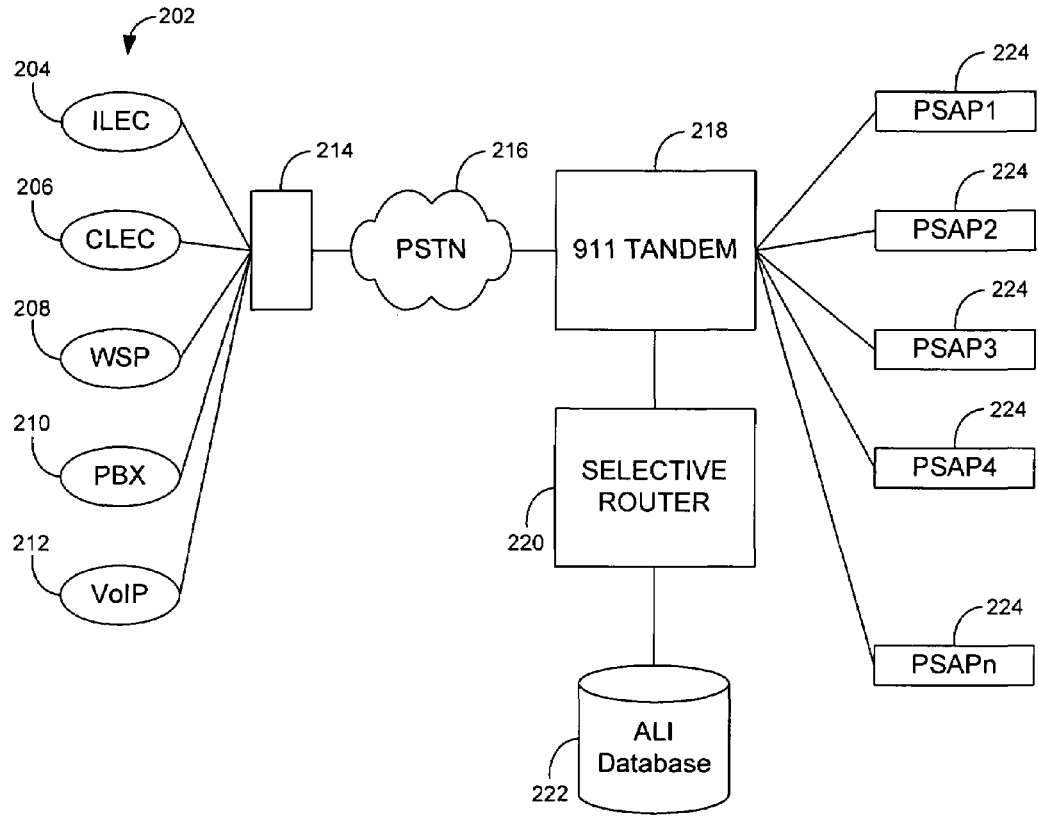
FIG. 2 is a diagram illustrating selected elements of a telecommunications system for handling emergency calls according to an embodiment of the present invention.

FIG. 2 shows a system 200 for making emergency calls according to embodiments of the invention. System 200 includes a interface 214 that translates an emergency call made using a three-digit emergency number (e.g., 9-1-1 calls) into one that has a emergency service number used to put the call on a PSTN 216. The emergency call may originate from an emergency service requestor (ESR) (e.g., a person, security alarm device, etc.) placing the call on a communication device (not shown) supported by one of the communication service providers 202. The emergency service providers 202 may be, for example, an incumbent local exchange carrier (ILEC) 204, an competitive local exchange carrier (CLEC) 206, a wireless service provider 208, a private branch exchange (PBX) 210, or a Voice over IP (VoiP) provider 212, among other types of providers.

Interface 214 receiving an emergency call from one of the providers 202 initiates an emergency service call on the PSTN 216 using an emergency service number. The emergency service number may be a telephone number compatible with the PSTN 216 (e.g., a seven-digit TN, and ten-digit TN, etc.) and may include a numbering plan digit (NPD) (e.g., a telephone area code).

The emergency call is sent through PSTN 216 to 9-1-1 tandem 218 without passing through an ES trunk. The 9-1-1 tandem 218 may be thought of as an end office (EO) (e.g., a class 5 telephone system EO) with added functionality to receive emergency calls from a variety of different service provider types 202. 9-1-1 tandem 218 may include a telephone company switch for establishing a communications link between the service providers 202 and the PSAPs 224.

Selective router 220 takes calls coming into the 9-1-1 tandem 218 and matches them to the most appropriate PSAP 224. The matching may be done automatically by comparing information that accompanies the emergency call with information in ALI database 222.

For example, automatic location information (ALI) that accompanies the emergency call (e.g., the requestor's state, county, municipality, community, street name, house number, etc.) may be compared with a Master Street Address Guide (MSAG) in database 222. When the selective router 220 matches the emergency call ALI with an entry in the MSAG, an emergency service zone (ESZ) associated with the entry may be identified, which also identifies one or more PSAPs appropriate for that ESZ. The PSAPs may be identified by a PSAP identification number (e.g., a three to five-digit number) that the selective router 220 sends to tandem 218 so that the emergency call can be routed to the identified PSAP from among the set of PSAP1 to PSAPn 224.

In another example, selective router 220 may include a human operator (not shown) that reads information associated with the emergency call (e.g., ALI, ANI, etc.) on a display screen and compares it to entries from database 222 associated with each of PSAP1 to PSAPn 224. Based on the comparison, the operator selects the most appropriate PSAP from among the PSAPs 224 and instructs tandem 218 to route the emergency call to the selected PSAP.

Figure 3:
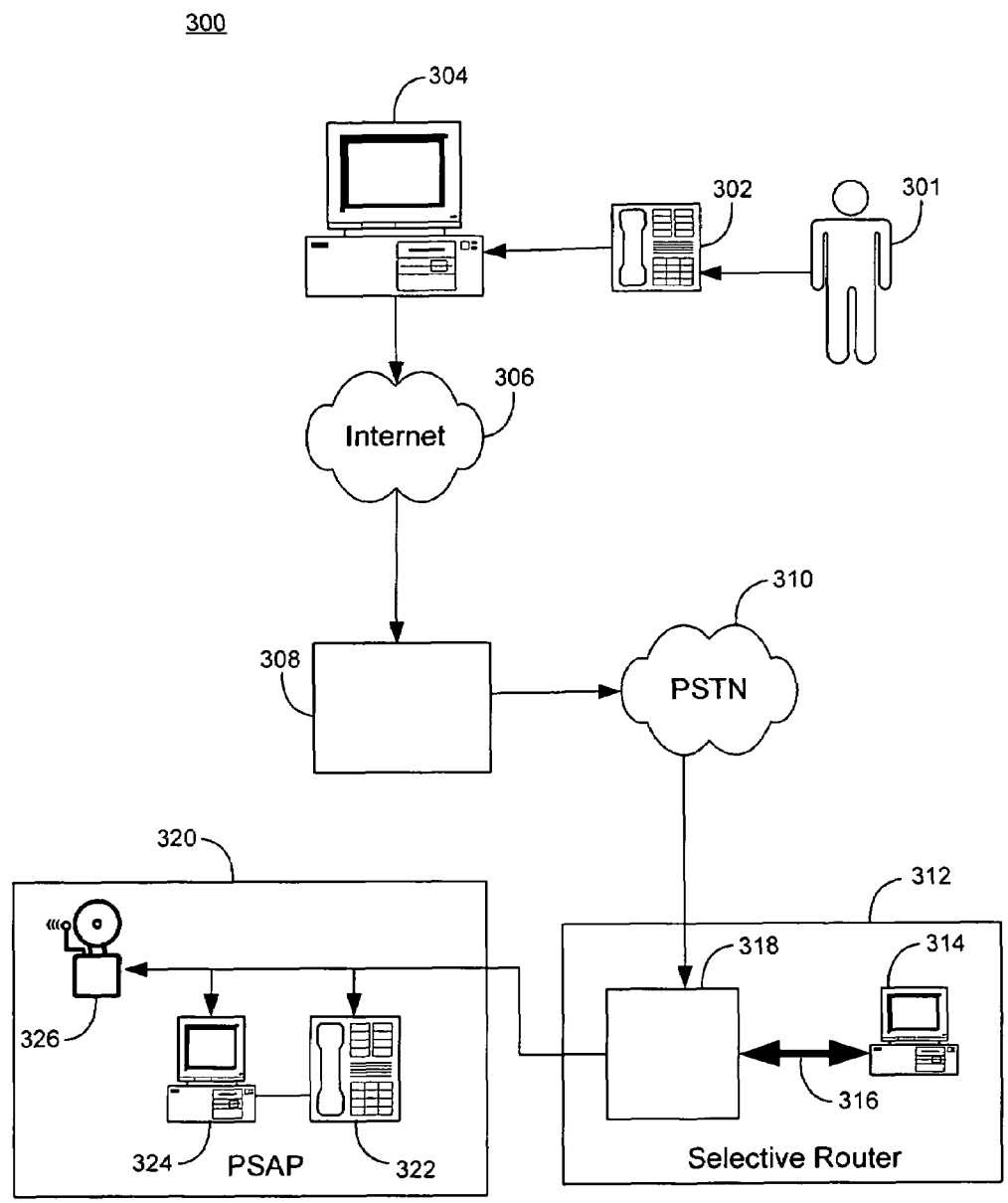
FIG. 3 is a diagram illustrating selected elements of a telecommunication system for handling emergency calls according to another embodiment of the present invention.

Referring now to FIG. 3, another system 300 for making emergency calls according to embodiments of the invention is shown. The system includes an emergency service requestor (ESR) 301 originating an emergency call on system 300. An emergency service requestor may be any user (e.g., person, subscriber, operator, dispatcher, etc.), device (e.g. fire detector, hazardous materials detector, etc.), or system (e.g., alarm system, etc.) that can make an emergency call. In the embodiment shown, ESR 301 is a person.

ESR 301 originates the emergency call by dialing a three-digit emergency number (e.g., 9-1-1) on communication device 302. The communication device 302 may be any device that can interface ESR 301 with the rest of system 300, including, for example, a wireline telephone, a wireless telephone (e.g., cellular telephones, satellite telephones, etc.), an computer network telephone (e.g., a VoIP telephone), among other devices. In the embodiment shown, communication device 302 is a VoIP telephone that connects to node 304 (e.g., a computer), which connects to the Internet 306.

Interface 308 provides electronic communication between the communication device 302 and the public switched telephone network (PSTN) 310. Interface 308 may be a switch, gateway, etc. that receives the three-digit emergency number and converts it into a emergency service number (ESN) that sends the emergency call to the appropriate emergency selective router 312 via PSTN 310. The ESN may be a telephone number that is interpreted by PSTN 310 to route the emergency call to a designated emergency selective router 312. For example, the ESN may be a telephone number comprising a NPD, a seven-digit number, a ten-digit number, etc.

The emergency call sent through PSTN 310 may include real time voice information (e.g. an analog or digital voice signal), automatic number identification (ANI) information, and/or pseudo-automatic number identification (pANI) information, among other kinds of information. In some embodiments the ANI (or pANI) comprises the ESR's 301 telephone number (sometimes referred to as the Calling Party Number (CPN)). In some embodiments the CPN may be an eight-digit number where the first digit is an NPD and the remaining seven digits represent the requestor's telephone number. The ANI (or pANI) may further be framed with a key pulse (KP) at the beginning and start (ST) at the end of the CPN in the format: KP-NPD-NXX-XXXX-ST.

The emergency call is received from PSTN 310 at the emergency selective router 312, which will route the call to the appropriate public safety access point (PSAP) 320. The emergency call may reach selective router 312, at switch 318, which in the embodiment shown is administered by computer station 314 through a host connected interface (HCI) link 316. Switch 318 may be, for example, a conventional telephone switch compatible with the SS7 telecommunications protocol (e.g., an 5ESS switch from Lucent Technologies, Inc., a DMS-100 switch from Nortel Networks, Inc., etc.)

As described above, ALI data accompanying the emergency call may be used with a Master Street Address Guide (MSAG) stored in or accessible by computer station 314 to associate location information in the ALI data with an emergency service zone (ESZ). The ESZ, in turn, may be associated with a PSAP identification number that the computer 314 sends to switch 318 via HCI link 316. The switch 318 then routes the emergency call to designated PSAP 320. The comparison of the ALI data with the entries in the MSAG tables may be done automatically by computer station 314 or may include one or more manual operations performed by a router administrator (not shown) working at station 314.

In other embodiments, the ANI or pANI data passed to the emergency selective router 312 and/or PSAP 320 may only consist of the CPN. The administrator at emergency selective router 312 or PSAP 320 may use the CPN to request additional information (e.g., identity, home address, etc.) about ESR 301 from an ALI database maintained by a service provider (not shown) for communication device 302. Alternatively, the additional information may be automatically included with the ANI or pANI data.

When the emergency call arrives at PSAP 320 it may activate a notification device 326 that notifies a dispatcher or attendant (not shown) that an emergency call as arrived. The emergency call may also be routed to a communication device 322 (e.g., a telephone) and/or a network node 324 (e.g., a computer) for handling the emergency call. The PSAP 320 may handle emergency calls for a police department, fire department, poison control center, emergency medical service (EMS), hospital, or hazardous material recovery department, among other public safety organizations. In some embodiments, PSAP 320 may be a centralized dispatcher for two or more public safety organizations. Additional details and other embodiments of PSAP 320 and other components are described in U.S. Pat. No. 5,379,337, filed Aug. 16, 1991 and titled "Method and System for Providing Emergency Call Service", the entire contents of which are herein incorporated by this reference.

Exemplary Method of Making an Emergency Call

Figure 4:
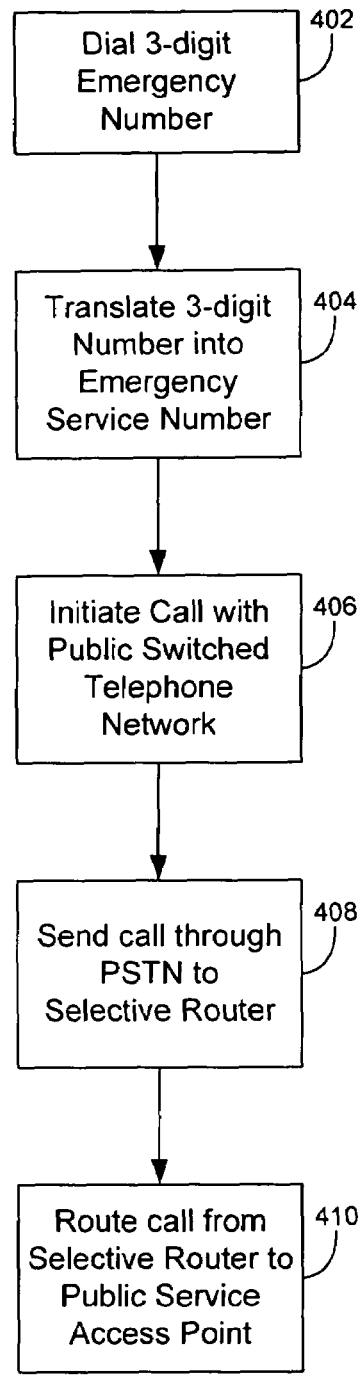
FIG. 4 is a flowchart illustration a method of making an emergency call according to an embodiment of the present invention.

FIG. 4 illustrates a method 400 of making an emergency call according to an embodiment of the invention. Method 400 start by dialing a 3-digit emergency number 402 (e.g., the 9-1-1 emergency number) on a communication device. The dialer (also referred to as an emergency service requestor) may be a person, device, system (e.g., a security alarm system) or some other entity capable of placing an emergency call.

After the three-digit emergency number is dialed, an interface (e.g., an end office of a communication device service provider) recognizes that the call is an emergency call, and translates the number 404 into an emergency service number telephone number (ESN/TN) that can be used to initiate 406 a call on a public switched telephone network (PSTN) which communicates with the interface. As noted above the ESN/TN may include a NPD (e.g., an area code) and may be a seven-digit telephone number, a ten-digit telephone number, etc.

In some embodiments, when the interface bypasses a dedicated ES trunk connected to the selective router and instead puts the call on the PSTN to reach the router. In other embodiments, no ES trunk is present to be bypassed by the interface in favor of the PSTN.

The ESN/TN is used to send 408 the call going through the PSTN to a designated selective router. In some embodiments, the router includes a switch that accepts the call from the PSTN and relays it to a designated PSAP. For example, the switch may be a 5ESS switch made by Lucent Technologies Inc. that accepts the emergency call from SS7 standardized PSTN communications line, where the call has the ANI in the charge number field of the SS7 LAM message. Alternatively, if the charge number field is not populated (e.g., the call originated from VoIP telephone) then the ANI may be searched in the calling party number (CPN) field.

The ANI on the incoming emergency call may be processed by the 5ESS switch with a digit analysis selector (DAS) that uses a local digit interpreter table (LDIT), incoming digit interpreter table (INDIT) and emergency service central office (ESCO) table to assign the call to the right PSAP. The LDIT allows the call to pass to the proper remaining digit interpretation trees (RDIT), which after verifying the ESCO, routes the call to a designed PSAP.

In another example, the switch may be a DMS-00switch made by Nortel Networks, Inc. that also accepts the emergency call from the SS7 standardized PSTN. The DMS-100 switch uses a virtual facilities group to size the number of calls let through and uses a 911 feature package to do a query on the ANI to find the proper PSAP routing number (also sometimes called an ESN number). If no record (or an inadequate record) is found in the ANI, a default ESCO and ESN may be assigned on a virtual trunk group (VIRTGRP) that the emergency call uses to get routed to a default PSAP.

The PSAP may handle emergency calls for police departments, fire departments, poison control centers, emergency medical services (EMS), hospitals, or hazardous material recovery departments, among other public safety organizations. They may also be a centralized point for two or more public safety organizations.

Having described several embodiments, it will be recognized by those of skill in the art that various modifications, alternative constructions, and equivalents may be used without departing from the spirit of the invention. Additionally, a number of well known processes and elements have not been described in order to avoid unnecessarily obscuring the present invention. Accordingly, the above description should not be taken as limiting the scope of the invention.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, or groups.

What is claimed is:

1. A method of making an emergency call comprising:
    dialing a three-digit emergency number on a communication device;
    translating the three-digit emergency number into an emergency service number at an interface, wherein the interface uses the emergency service number to initiate the emergency call with a public switched telephone network; and
    sending the emergency call in the public switched telephone network to an emergency selective router, wherein the call bypasses a dedicated emergency service trunk, and wherein the emergency selective router routes the emergency call to a public safety answering point.

2. The method of claim 1, wherein the three-digit emergency number is 9-1-1.

3. The method of claim 1, wherein the emergency service number comprises a numbering plan digit.

4. The method of claim 1, wherein the emergency service number comprises a ten-digit number.

5. The method of claim 1, wherein the interface comprises a gateway or a switch that translates automatically the three-digit emergency number into the emergency service number.

6. The method of claim 1, wherein the communication device is a wireline telephone, a wireless telephone, or a voice over internet protocol telephone.

7. The method of claim 1, wherein the emergency call is given emergency status by the public switched telephone network and restrictions are removed on identification data associated with the call.

8. The method of claim 1, wherein the emergency selective router uses automatic number identification data associated with the emergency call to identify the public safety answering point.

9. The method of claim 1, wherein the emergency selective router relays identification data to the public safety answering point along with the emergency call.

10. The method of claim 1, wherein the public switched telephone network comprises a switch that is compatible with the SS7 communication protocol.

11. The method of claim 1, wherein in the three-digit emergency number is dialed by an emergency service requestor.

12. The method of claim 11, wherein the emergency service requestor is a person or an electronic security system.

13. A system to make an emergency call comprising:
    a communication device comprising an input to dial a three-digit emergency number;
    an interface to translate the three-digit emergency number into an emergency service number, wherein the interface uses the emergency service number to initiate the emergency call with a public switched telephone network; and
    an emergency selective router that receives the emergency call from the public switched telephone network and routes the call to a public safety answering point, wherein the call bypasses a dedicated emergency service trunk coupled to the emergency selective router.

14. The system of claim 13, wherein the communications device comprises a wireline telephone, a wireless telephone, or a voice over internet protocol telephone.

15. The system of claim 13, wherein the three-digit emergency number is 9-1-1.

16. The system of claim 13, wherein the interface comprises a gateway or a switch that translates automatically the three-digit number into the emergency service number.

17. The system of claim 13, wherein the emergency service number comprises a ten-digit number.

18. The system of claim 13, wherein the system does not include a dedicated emergency service trunk to route emergency calls to the emergency selective router.

19. A method of routing an emergency call through a public switched telephone network, the method comprising:
    translating, automatically, a three-digit emergency number dialed by an emergency service requestor into an emergency service number, wherein the emergency service number is used to initiate the emergency call with the public switched telephone network; and
    sending the emergency call through the public switched telephone network to an emergency selective router, wherein the emergency selective router routes the call to a public safety answering point, wherein the emergency call is not sent through a dedicated emergency service trunk.

20. The method of claim 1, wherein the public safety access point comprises a dispatcher for a police department, a fire department, an ambulance company or a hospital.

* * * * *